(12) United States Patent
Kai et al.

(10) Patent No.: US 7,667,658 B2
(45) Date of Patent: Feb. 23, 2010

(54) ANTENNA AND RFID TAG WITH SAME MOUNTED

(75) Inventors: Manabu Kai, Kawasaki (JP); Toru Maniwa, Kawasaki (JP); Takashi Yamagajo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/826,610

(22) Filed: Jul. 17, 2007

(65) Prior Publication Data

US 2007/0279313 A1 Dec. 6, 2007

Related U.S. Application Data

(63) Continuation of application No. PCT/JP2005/000826, filed on Jan. 24, 2005.

(51) Int. Cl.
*H01Q 11/12* (2006.01)
(52) U.S. Cl. .............. 343/741; 343/866; 340/572.7
(58) Field of Classification Search ........... 343/741, 343/742, 866, 867; 340/572.7
See application file for complete search history.

(56) References Cited

U.S. PATENT DOCUMENTS

| | | | | |
|---|---|---|---|---|
| 6,285,342 | B1 * | 9/2001 | Brady et al. | 343/895 |
| 6,404,335 | B1 * | 6/2002 | Ohno et al. | 340/505 |
| 7,183,994 | B2 * | 2/2007 | Weigand | 343/795 |
| 7,408,467 | B2 * | 8/2008 | Kai | 340/572.7 |
| 2001/0007335 | A1 | 7/2001 | Tuttle et al. | 235/492 |
| 2004/0227681 | A1 | 11/2004 | Deng | 343/742 |
| 2005/0052985 | A1 * | 3/2005 | Senshu et al. | 369/273 |

FOREIGN PATENT DOCUMENTS

| | | |
|---|---|---|
| EP | 0 877 439 A2 | 11/1998 |
| EP | 0 901 182 A2 | 3/1999 |
| JP | 55-150507 | 10/1980 |
| JP | 03-080603 | 4/1991 |
| JP | 07-271951 | 10/1995 |
| JP | 2008-195611 A | 7/1996 |
| JP | 2001-203529 A | 7/2001 |
| JP | 2002-188754 A | 7/2002 |
| JP | 2003-198231 A | 7/2003 |
| JP | 2004-295907 A | 10/2004 |
| JP | 2005-347798 | 12/2005 |
| JP | 2005-347799 | 12/2005 |
| WO | WO 00/22893 | 4/2000 |
| WO | WO 01/84667 | 11/2001 |

OTHER PUBLICATIONS

Japanese Official Action issued on Jul. 22, 2008 in the corresponding Japanese Patent Application No. 2006-553801.
Japanese Official Action dated Oct. 7, 2008 with Eng. Translation issued in the corresponding Japanese Application No. 2006-553801.

\* cited by examiner

*Primary Examiner*—Tho G Phan
(74) *Attorney, Agent, or Firm*—Hanify & King, P.C.

(57) ABSTRACT

A tag antenna which, within a limited area, resonates with an RFID LSI chip having a capacitance component, and an RFID tag on which such a tag antenna is mounted, and which has an antenna and an LSI chip connected in parallel to the antenna are disclosed; the antenna has a feed terminal connected to the LSI chip, a loop antenna connected to the feed terminal, and a bypass conducting path which bypasses the loop of the loop antenna.

6 Claims, 11 Drawing Sheets

FIG. 8A
FIG. 8B
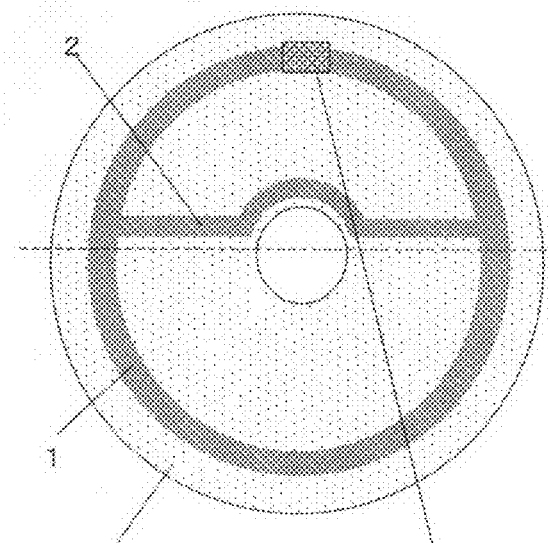
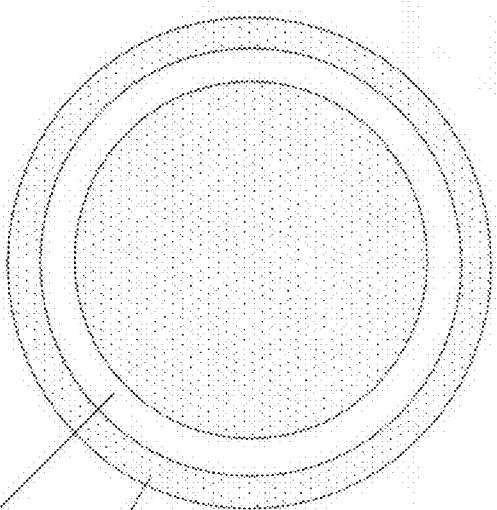
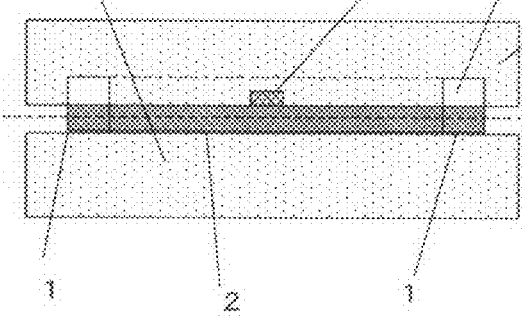
FIG. 8C

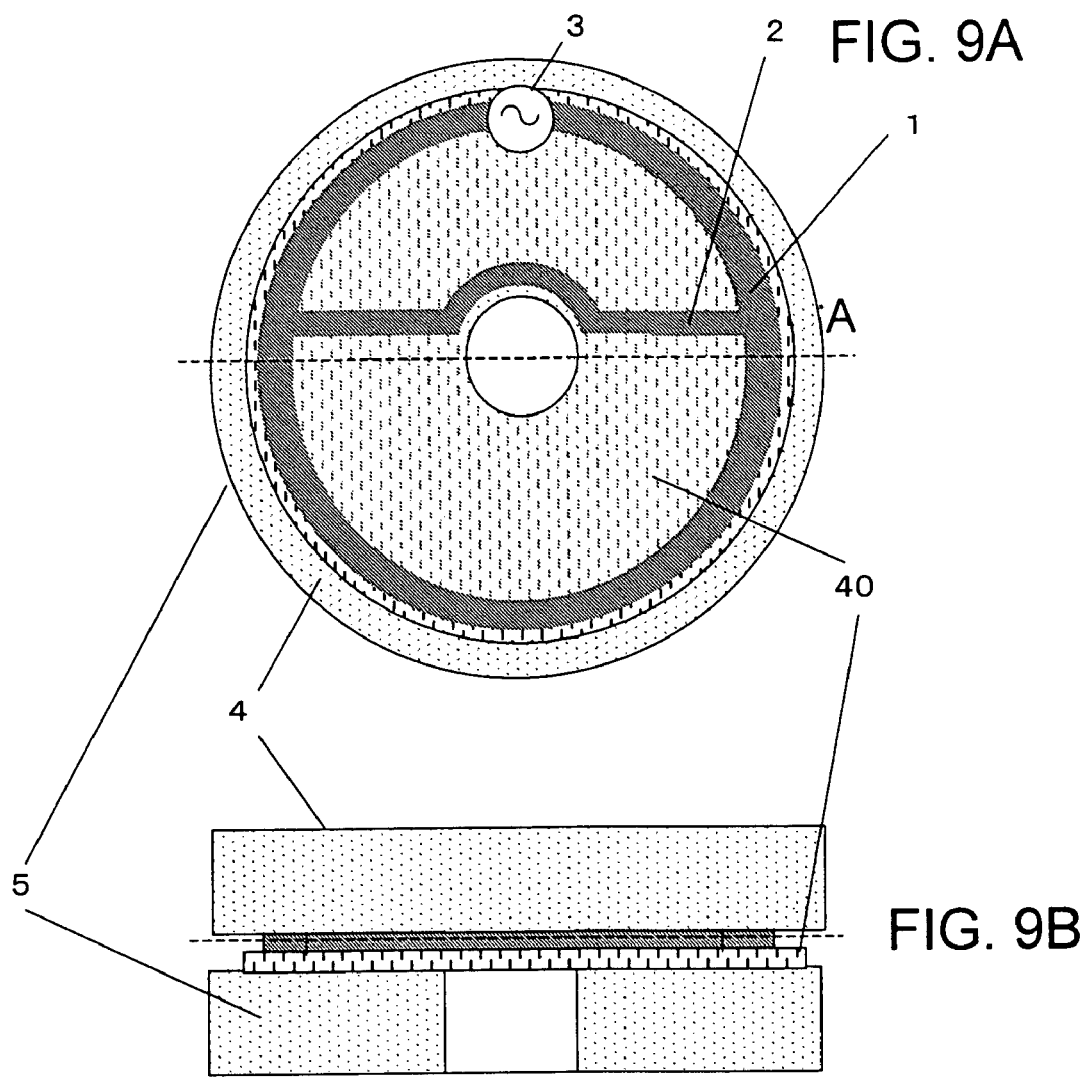

ANTENNA AND RFID TAG WITH SAME MOUNTED

CROSS-REFERENCE TO RELATED APPLICATIONS

This application is a continuation of international application PCT/JP2005/000826, filed on Jan. 24, 2005.

TECHNICAL FIELD

The present invention relates to an antenna and a tag with such an antenna mounted, and in particular relates to an antenna comprising a loop antenna suited for use in a non-contact type tag which performs transmission and reception with an RFID reader/writer, and an RFID tag with such an antenna mounted.

BACKGROUND ART

In recent years, there has been widespread introduction of systems in which tags storing article information are attached to articles, including cattle and other living beings, and in which this information is read by non-contact means to manage data. An example of such a system is called an RF (radio frequency) ID system. In such a system, wireless signals of power approximately 1 W in the UHF band (860 to 960 MHz) are used to transmit signals from a reader/writer.

On the tag side, power to start processing is generated based on this signal, and a response signal is returned to the reader/writer from the tag according to instruction information comprised by the signal. By this means, information within the tag can be read by the reader/writer.

A tag attached to an article comprises an antenna, and a functional chip connected to the antenna. The communication distance between the tag and the reader/writer depends on the gain of the antenna incorporated within the tag, the chip operating voltage, and the surrounding environment, but is approximately 3 meters.

The interface portion of the LSI chip 20 mounted in a tag can be represented as equivalent to a parallel connection of a resistance Rc (for example, resistance value=1000Ω) and a capacitance C (for example, capacitance value=0.7 pF), as shown in FIG. 1 explaining matching of the antenna and the LSI chip. On the other hand, the antenna mounted on the tag (called the tag antenna) can be represented as equivalent to a parallel connection of a resistance Ra (for example, resistance value=1000Ω) and an inductance L (for example, inductance value=40 nH).

As a result of parallel connection of the two, the capacitance value C and inductance value L are in resonance, and as indicated by equation (1), the imaginary component is substantially zero and matching is achieved, so that the power received by the tag antenna 10 is adequately supplied to the LSI chip 20.

$$f_0 = \frac{1}{2\pi\sqrt{LC}} \quad (1)$$

The most basic design for the tag antenna 10 is that of a resonant dipole antenna with total length equal to λ/2; in the UHF band, a length of approximately 150 mm is required. However, in consideration of cases in which such tags are affixed to the ears of cattle and managed, for example, there is a demand to form tags with a maximum diameter of approximately 35 mm.

However, it is substantially impossible to form a λ/2 resonant dipole antenna with such a required size.

The use of a loop antenna configured such as the loop antenna 1 connected to a feed terminal 3 shown in FIG. 2 is conceivable. A loop antenna has characteristics such as those explained for example in Antenna Engineering Handbook, published by Ohmsha, Ltd., Mar. 5 1999, pp. 20-22. That is, it is explained that when a common-mode current flows uniformly in a circular loop 1 connected to a feed terminal 3, as the loop radius is increased, the number of lobes of the power pattern increases.

DISCLOSURE OF THE INVENTION

As explained above, it is most important for matching between the chip 20 and the tag antenna 10 that in a tag used in an RFID system, the capacitance value C of the interface portion of the LSI chip 20 and the inductance value L of the antenna 10 be in resonance at the frequency used, as indicated in FIG. 1.

On the other hand, when the tag antenna 10 is configured with only a loop antenna structure such as that shown in FIG. 2, there is no inductance L portion such as shown in FIG. 1, and so satisfactory matching with the inductance portion of the LSI chip 20 is not obtained, power is not supplied adequately from the antenna 10 to the chip 20, and so there is the problem that the communication distance is reduced drastically.

When, for convenience of handling, the tag antenna 10 is enclosed in a dielectric case and similar, the dielectric constant and thickness of the dielectric member used as the case must be considered when designing the shape of the antenna.

Hence an object of this invention is to provide a tag antenna which, while having limited size, resonates with an RFID LSI chip having a capacitance component, and an RFID tag on which this antenna is mounted.

A first aspect of an antenna of the invention which attains the above object is characterized in having a feed terminal, a loop antenna connected to the feed terminal, and a bypass conducting path which bypasses the loop of the loop antenna.

A second aspect of an antenna of the invention which attains the above object is the first aspect, characterized in that the bypass conducting path is arranged have a distance S from the center of the loop antenna, and that the size of the distance S is set such that the inductor which is the bypass conducting path has a prescribed inductance value.

A third aspect of an antenna of the invention which attains the above object is the second aspect, characterized in that the prescribed inductance value is a value resulting in resonance with the capacitance value of the interface portion of the LSI chip connected to the feed terminal.

A first aspect of an RFID tag of the invention which attains the above object is characterized in having an LSI chip connected in parallel to the antenna, and in that the antenna has a feed terminal connected to the LSI chip, a loop antenna connected to the feed terminal, and a bypass conducting path which bypasses the loop of the loop antenna.

A second aspect of an RFID tag of the invention which attains the above object is the RFID tag of the first aspect, characterized in that the bypass conducting path is arranged have a distance S from the center of the loop antenna, and that the size of the distance S is set such that the inductor which is the bypass conducting path has a prescribed inductance value.

A third aspect of an RFID tag of the invention which attains the above object is the RFID tag of the second aspect, characterized in that the prescribed inductance value is a value resulting in resonance with the capacitance value of the interface portion of the LSI chip connected to the feed terminal.

A fourth aspect of an RFID tag of the invention which attains the above object is the RFID tag of the first aspect, characterized in further having a conducting plate, which is arranged on the side of at least one face of the antenna, and which holds the antenna.

A fifth aspect of an RFID tag of the invention which attains the above object is the RFID tag of the fourth aspect, characterized in that a penetrating hole is provided in the center of the conducting plate.

A sixth aspect of an RFID tag of the invention which attains the above object is the RFID tag of the fifth aspect, characterized in that the bypass conducting path has an arc, along the periphery of the penetrating hole, which avoids the penetrating hole.

A seventh aspect of an RFID tag of the invention which attains the above object is the RFID tag of the fourth aspect, characterized in having, in the conducting plate, a ring-shape depression, corresponding to the loop antenna, having width and depth enabling accommodation at least of the LSI chip.

An eighth aspect of an RFID tag of the invention which attains the above object is the RFID tag of the fourth aspect, characterized in that the antenna is formed, on a sheet, from a conductor the main component of which is any one among Cu, Ag, and Al.

By means of this invention, a tag antenna which resonates with an RFID LSI chip having a capacitance component, and a tag on which such an antenna is mounted, can be provided within an extremely limited area of diameter approximately 35 mm.

BRIEF DESCRIPTION OF THE DRAWINGS

FIGS. 8A, 8B and 8C show an embodiment in which the LSI chip is configured integrally with the tag antenna;

FIGS. 9A and 9B show another embodiment configuration;

PREFERRED EMBODIMENTS OF THE INVENTION

Figure 1:
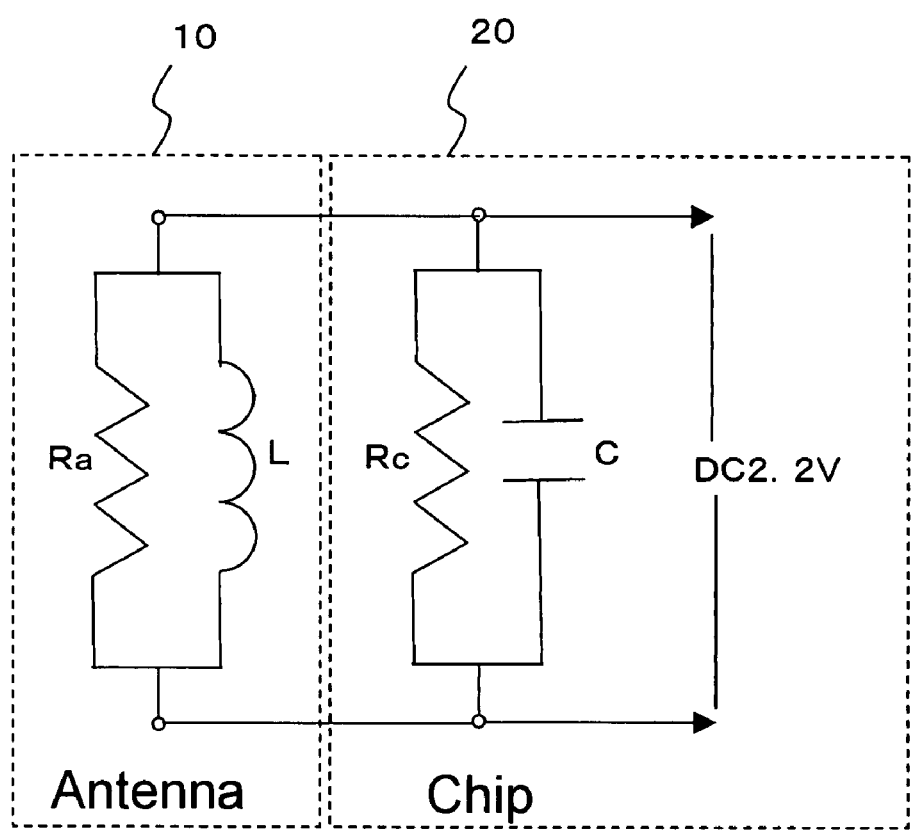
FIG. 1 explains matching of an antenna and LSI chip.
Figure 2:
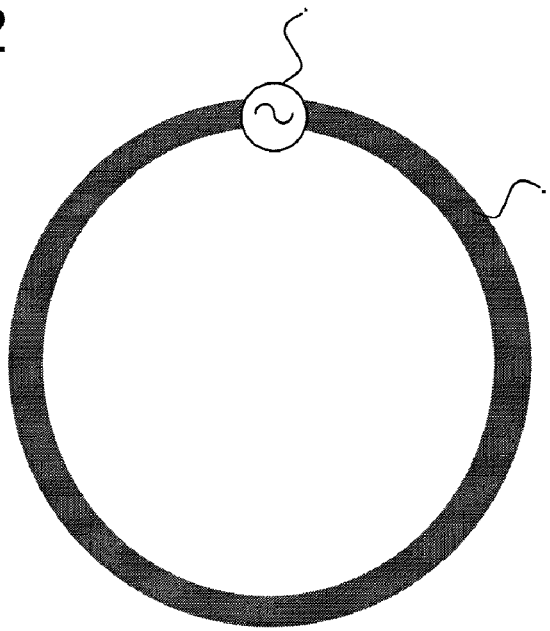
FIG. 2 explains a conventional loop antenna.

Below, embodiments of the invention are explained referring to the drawings. The aspects are provided to facilitate understanding of the invention, but the technical scope of the invention is not limited to these aspects.

Principle of the Invention

Figure 3:
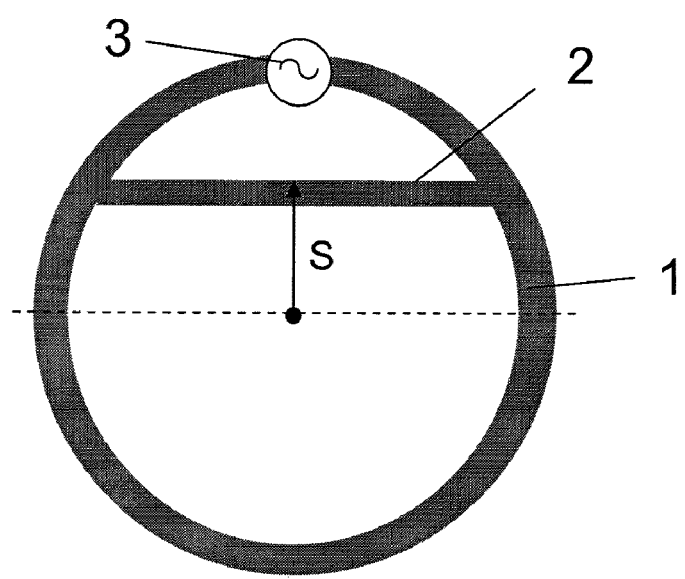
FIG. 3 explains the principle of configuration of an antenna of this invention.

Prior to an explanation of the embodiments, the principle of an antenna configuration according to this invention is explained using FIG. 3. In FIG. 3, a loop antenna 1 connected to a feed terminal 3 is formed. In addition, a bypass conducting line is formed within the loop antenna 1, as a matching inductor L. In FIG. 3, S is the distance from the center of the loop antenna 1 to the bypass conducting line 2; the parameter (S) of the inductance value L due to the bypass conducting line 2 is varied as this distance S changes.

Figure 4:
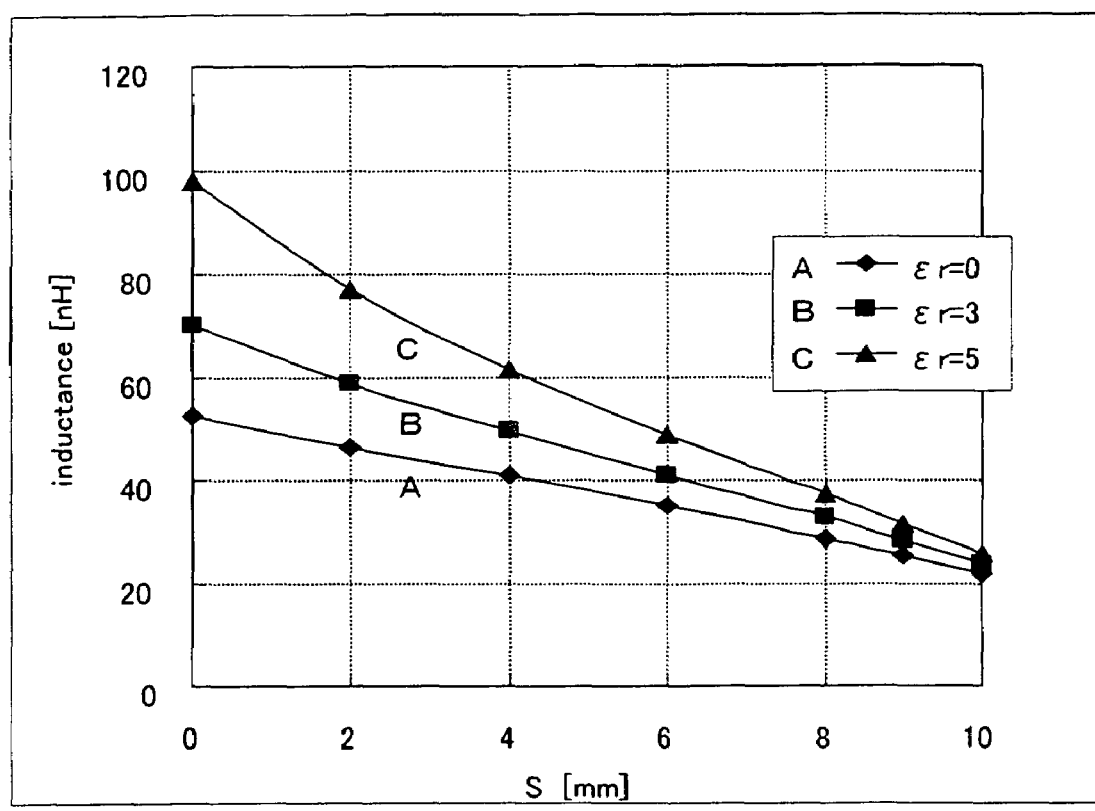
FIG. 4 is a graph showing the relation between the inductance value L and the distance S from the center of the loop antenna 1 to the bypass conducting path 2.

FIG. 4 is a graph showing the relation between the inductance value L and the distance S from the center of the loop antenna 1 to the bypass conducting line 2. The numerical values shown in FIG. 4 are calculated values obtained from an electromagnetic field simulator; it is seen that the inductance value L changes depending on the distance S from the center of the loop antenna 1. Hence by appropriately choosing a distance S, an inductance value L can be set for the tag antenna 10 to match the capacitance value C of the interface portion of the LSI chip 20.

For example, when the capacitance value of the capacitor C of the LSI chip 20 to be matched is C=0.7 pF, then from the above equation (1), near f=950 MHz, resonance occurs at L=40 nH. Hence from FIG. 4, to obtain L=40 nH, when in the example of FIG. 3 the antenna is placed in air without modification, the dielectric constant ∈r is that of air (=0), and so from the characteristic curve A it is seen that matching of the tag antenna 10 and LSI chip 20 occurs when S=4.2 mm.

These inventors have confirmed in numerous prototype experiments that, for a tag antenna 10 with an outermost diameter of 33 mm and using Cu as the conducting material, with thickness 20 μm and wire width 2 mm, the resistance value of the parallel resistance Ra of the antenna is approximately 1000Ω. Hence adequate matching is possible even when the real-part resistance Rc of the LSI chip 20 is for example approximately 1000Ω to 2000Ω.

In FIG. 3, it is possible to hold the tag antenna 10 by forming a dielectric plate above and below, or on one face of, a planar antenna in which are formed a loop antenna 1 and bypass conducting line 2. It is desirable that the parameter (S) be selected according to the dielectric constant and thickness of the dielectric plate.

Embodiments

Figures 5A, 5B:
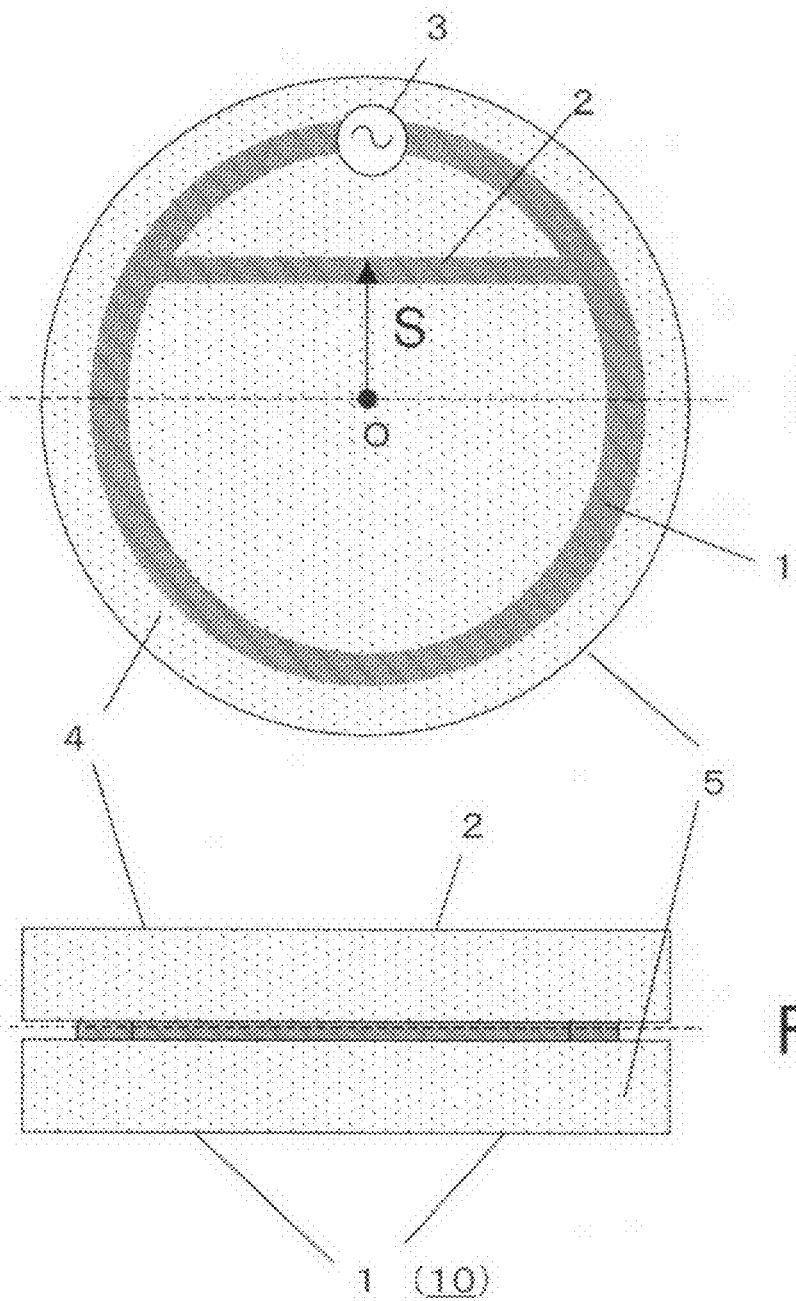
FIGS. 5A and 5B show a first embodiment according to the principle of the invention shown in FIG. 3.

FIG. 5 shows a first embodiment of the principle of the invention shown in FIG. 3. FIG. 5A is a plane view, and FIG. 5B is a central cross-sectional view.

Dielectric plates 4, 5 are arranged above and below the plane of a tag antenna 10, comprising a loop antenna 1 and a bypass conducting line 2, to enclose the tag antenna 10 and maintain the antenna shape. To this end, the dielectric plates 4, 5 are fixed to and enclose the tag antenna 10 with for example a resin adhesive or similar.

This embodiment corresponds to the conceptual diagram of FIG. 3; the bypass conducting line 2 is connected from midway in the loop antenna 1 connected to the feed terminal 3, to form an inductance component L.

As the dimensions in the embodiment, the outermost diameter of the loop antenna 1 is 33 mm, and Cu is used as the conducting material, with a thickness of 20 μm and wire width of 2 mm. The thickness of the dielectric plates 4, 5 is t=1 mm.

If the dielectric plates 4, 5 are formed from plastic, rubber, or similar, then it is well known that the dielectric constant takes on a value of approximately ∈r=3 to 5. Hence when characteristics are determined using an electromagnetic field simulator assuming ∈r=3 and ∈r=5, the characteristic curves B, C shown in FIG. 4 are obtained.

Similarly to characteristic curve A for the case of air with a dielectric constant ∈r=0, the inductance value L changes with the distance S; the distance from the loop center O of the loop antenna 1 to the bypass conducting line 2 is taken to be S. Based on calculated values obtained by the electromagnetic field simulator and shown in FIG. 4 above, when the dielectric constant of the dielectric plates 4, 5 is ∈r=3 in the configuration shown in FIG. 5, the characteristic curve B obtains, and when ∈r=5, the characteristic curve C obtains. Hence it is seen that in order to obtain resonance at L=40 nH, if ∈r=3 then S=6 mm, and if ∈r=5 then S=7.5 mm.

Figures 6A, 6B:
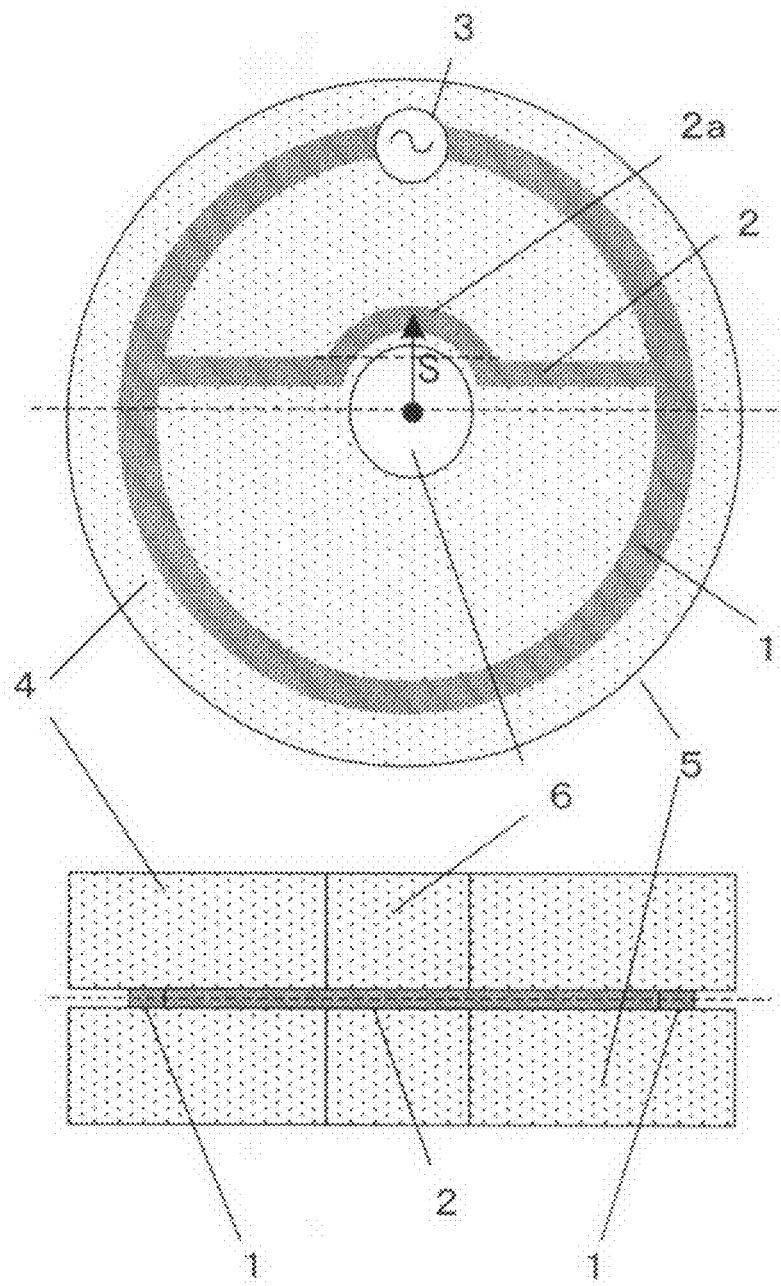
FIGS. 6A and 6B show an embodiment which takes into account a structure for installation of the RFID tag on an article.

Here, the structure of the RFID tag for installation on an article must be considered. FIG. 6 shows an embodiment which accommodates this need. A penetrating hole 6 is formed in the center portion of the RFID tag. This penetrating hole 6 can be used to install the tag on the article.

However, upon forming a penetrating hole 7 in the center, the penetrating hole 6 is superposed on the bypass conducting line 2. Hence in the embodiment of FIG. 6, the bypass conducting line 2 is formed having an arc 2a along the periphery of the penetrating hole 6, so as to avoid the penetrating hole 6. As a result of simulations in which this arc 2a was fixed, and the distance S from the straight-line conducting line portion of the bypass conducting line 2 was taken as a parameter in electromagnetic field simulations, coincidence with the characteristic curves A and B for ∈r=3 and ∈r=5, shown in FIG. 4, was obtained.

In FIG. 6, when the radius of the penetrating hole 6 is r1=6.5 mm, the conductor width is 2 mm, and the distance S is greater than (radius of penetrating hole 6+conductor width) (that is, when S>8.5 mm), then similarly to Embodiment 1, when for example the chip capacitance value is C=0.7 pF, from equation 1, resonance occurs in the vicinity of f=950 MHz when L=40 nH.

From FIG. 4, L=40 nH when ∈r=3 and S=6.1 mm, or when ∈r=5 and S=7.5 mm; hence by selecting an appropriate value of S according to the relative dielectric constant for the antenna configuration shown in FIG. 6, matching of the chip 20 and antenna 10 is possible.

Figures 7A, 7B:
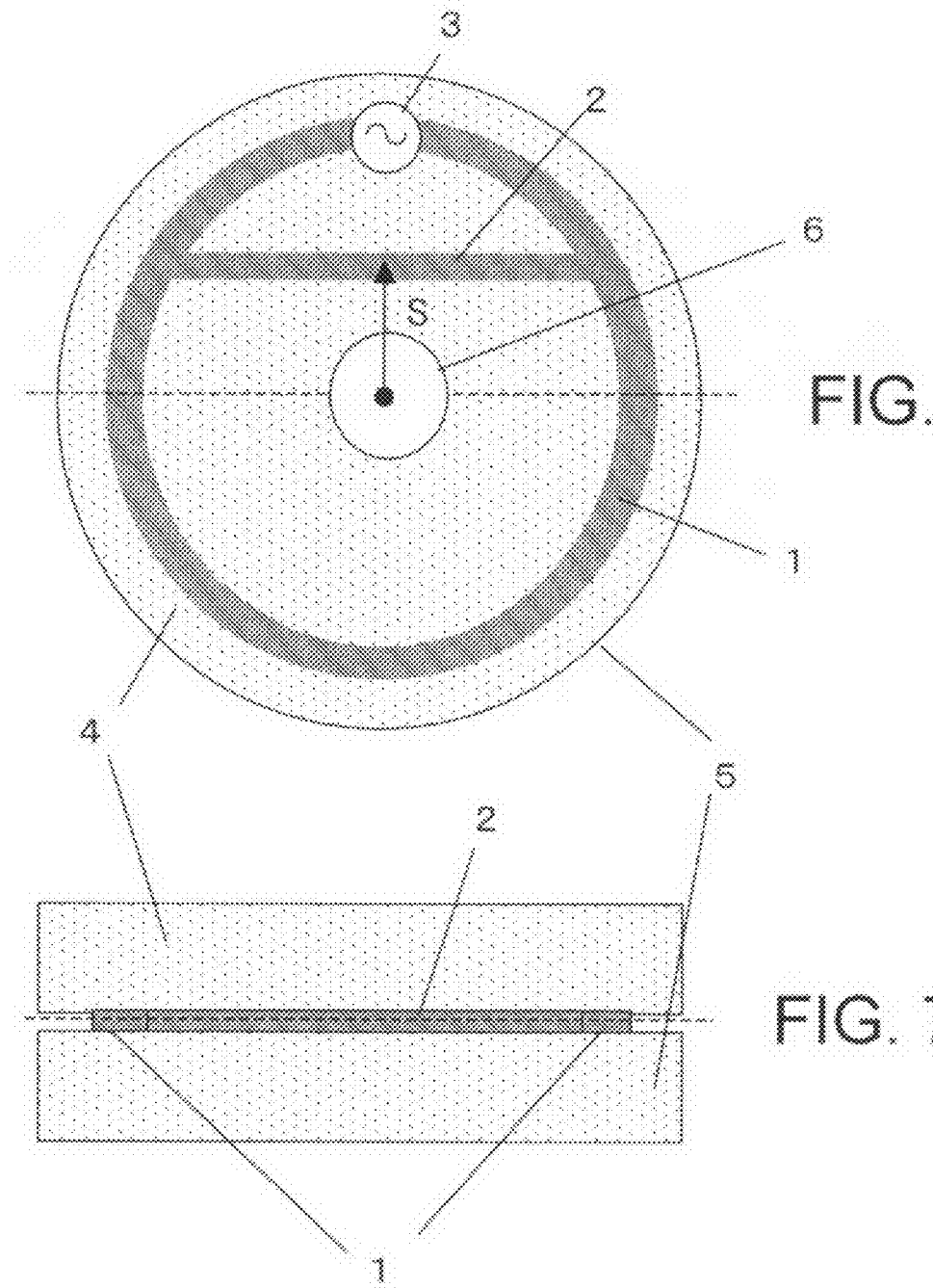
FIG. 7 is an embodiment which, for the embodiment of FIG. 5, takes into account a structure for installation of the RFID tag on an article.

FIG. 7 shows a further embodiment in which a penetrating hole 6 is provided; in contrast with the embodiment shown in FIG. 5, the size of the radius of the penetrating hole 6 is made smaller than the distance S from the center of the loop antenna 1 to the bypass conducting line 2, so that a configuration is made possible in which there is no need to provide the arc 2a shown in FIG. 6.

Here, it is desirable that the LSI chip 20 be formed integrally with the tag antenna 10. FIG. 8 shows the configuration of an embodiment which satisfies such a demand.

In FIG. 8, the LSI chip 20 is connected to the feed terminal of the tag antenna 10 comprising the loop antenna 1 and bypass conducting line 2 corresponding to FIG. 6. FIG. 8A is a diagram in which the tag antenna 10 and LSI chip 20 are mounted on a dielectric plate 5.

On the other hand, FIG. 8B shows the dielectric plate 4, having, as a characteristic, a ring-shape depression 30 corresponding to the loop antenna 1. The depression 30 has a width and depth enabling accommodation of, at least, an LSI chip 20 having a chip thickness of approximately 0.5 mm. Hence by superposing, in order, the dielectric plate 5, tag antenna 10 connected to the LSI chip 20, and dielectric plate 4, integral formation as shown in FIG. 8C is possible.

As a characteristic, upon superpositioning, a space is secured such that the LSI chip 20 can be received in the depression 30 of the dielectric plate 4, whatever the position of the LSI chip 20, so that the upper and lower dielectric members 4, 5 can be closely stacked. By this means, the number of processes required when enclosing the tag antenna 10 between the upper and lower dielectric members 4, 5 is reduced, and an inexpensive antenna unit can be supplied.

FIG. 9 shows the configuration of still another embodiment. In each of the above embodiments, as the method of fabrication of the tag antenna 10 comprising a loop antenna 1 and bypass conductor 2, a thin conductor of such materials as Cu, Ag, Al or similar (of thickness 20 μm for example) can be formed on an extremely thin sheet 40 (of thickness for example 0.1 mm) of paper, PET (polyethylene sheet), or similar. Or, in place of a thin conductor, a wire-shape conductor may be used.

Figures 10A, 10B:
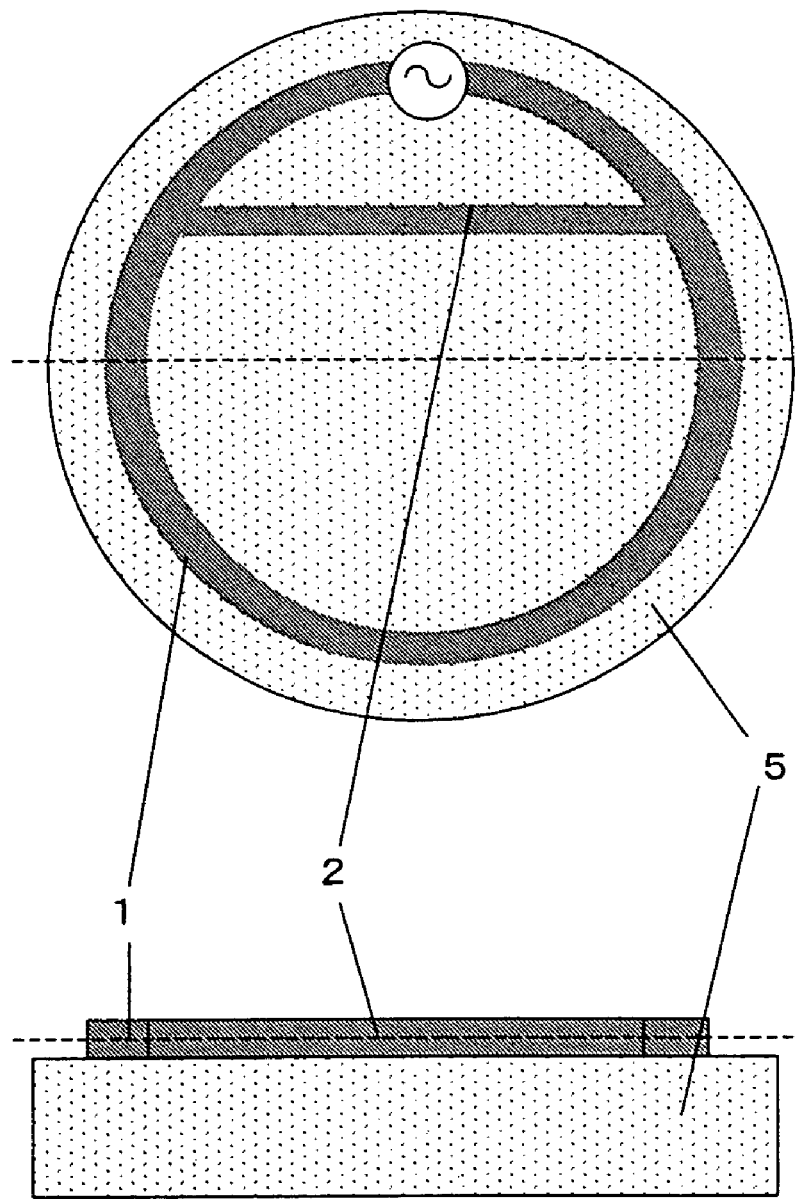
FIGS. 10A and 10B show an embodiment in which a dielectric member is formed only on one side of the tag antenna.

Also, in each of the above embodiments, configurations have been shown in which a tag antenna 10 comprising a loop antenna 1 and a bypass conductor 2 is enclosed between dielectric members 4, 5; but from the standpoint of holding the tag antenna 10, a configuration is also possible in which a dielectric member 4 (5) is formed on only one side of the tag antenna 10, as shown in FIG. 10.

FIG. 11 shows antenna directional characteristics obtained in electromagnetic field simulations of an antenna of this invention. The three axis directions x, y, z are defined as shown in FIG. 12, and the angle from the x-axis in the x-y plane is φ, while the angle from the z axis is θ.

Figure 11A:
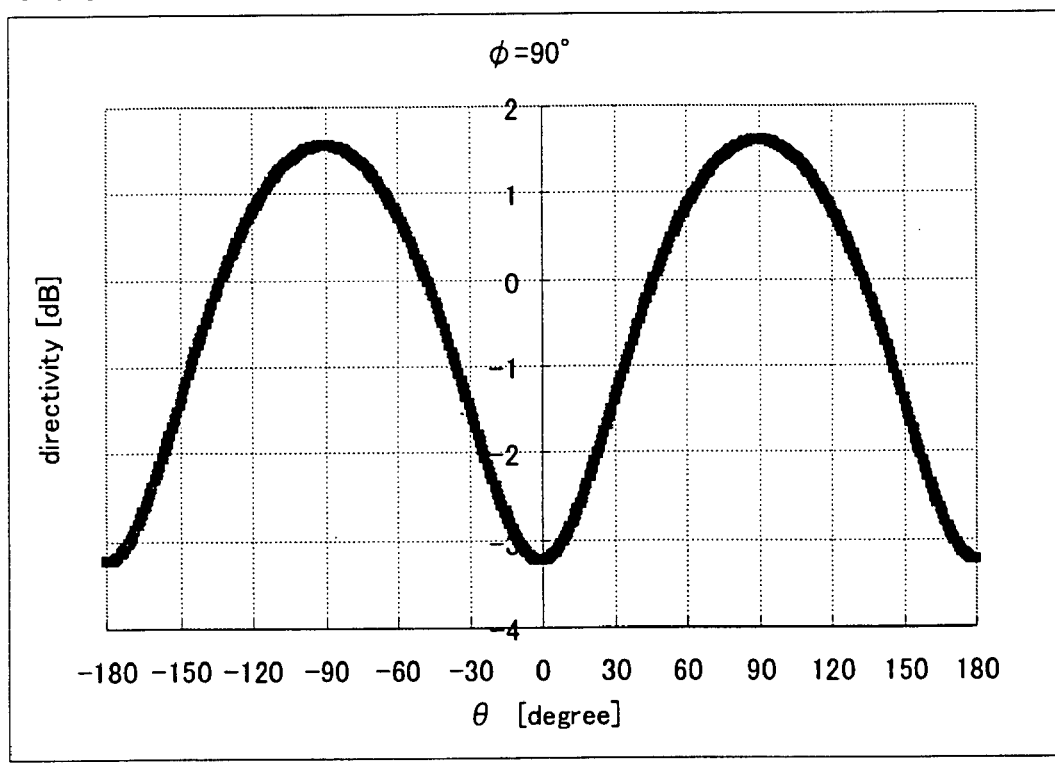
FIGS. 11A and 11B show the antenna directional characteristics obtained in electromagnetic field simulations of an antenna of this invention; and, FIG. 12 shows definitions of the three axis directions x, y, z in FIG. 11.
Figure 11B:
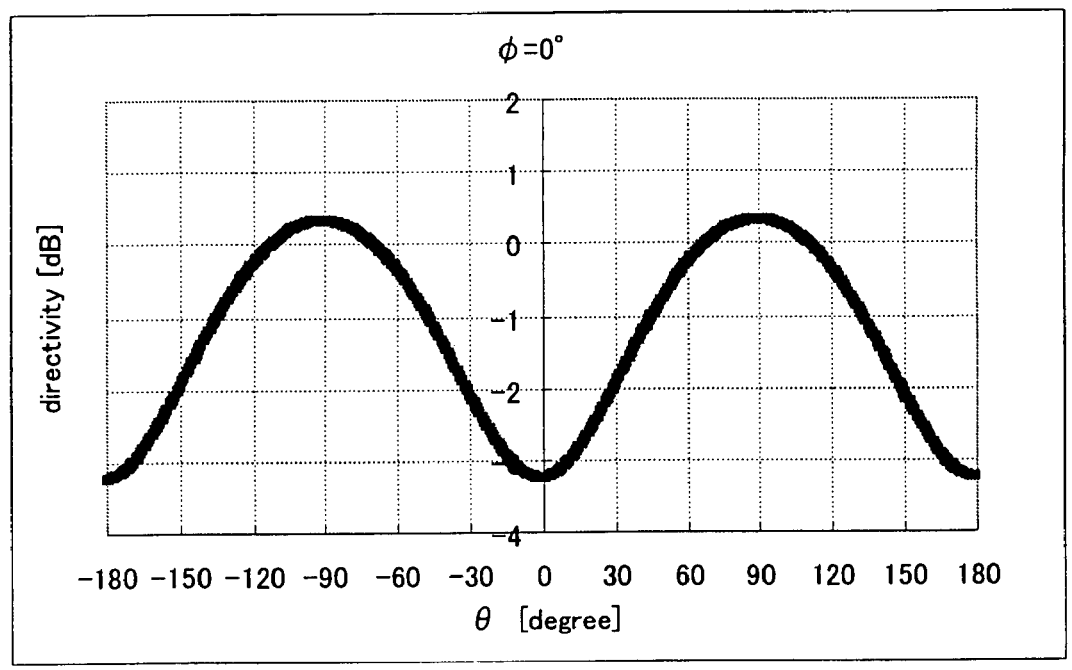
Figure 12:
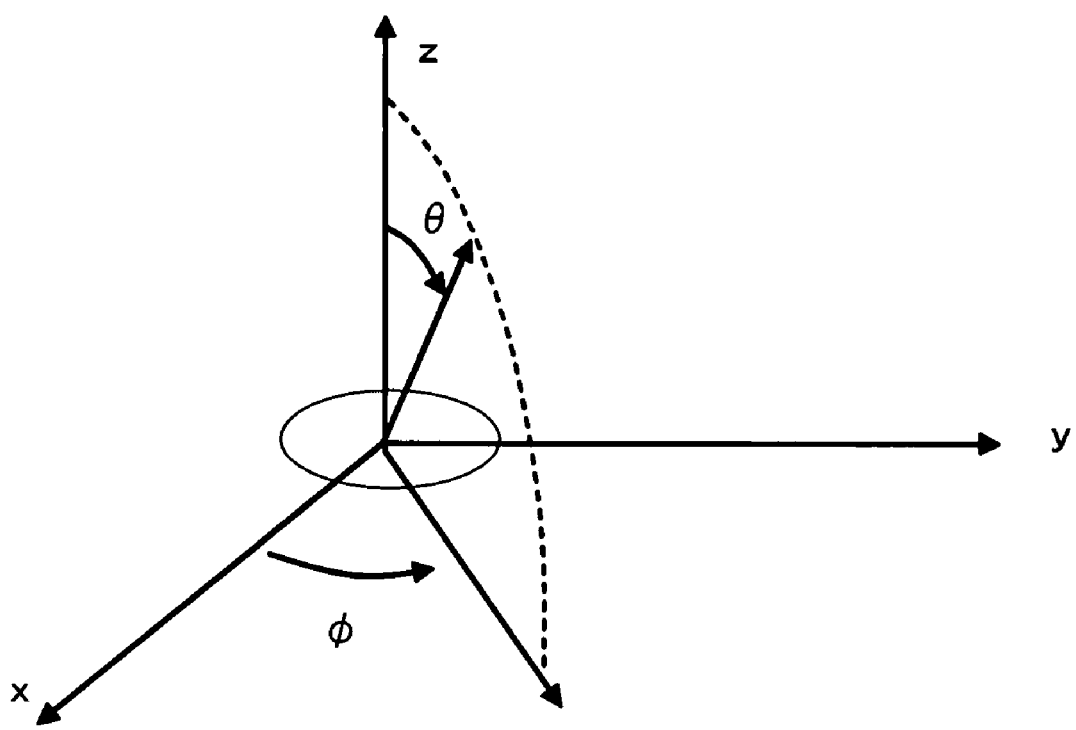

From FIG. 11A, at φ=90°, that is, in the y-axis direction, when the angle θ from the z-axis is 90° and −90°, the maximum directional characteristic is exhibited. From FIG. 11B, at φ=0°, that is, in the x-axis direction, when the angle θ from the z axis is 90° and −90°, the maximum directional characteristic is exhibited. In general, in FIG. 11A and FIG. 11B the same directional characteristics are shown, but more directionality is exhibited in general when θ=90° (FIG. 11A) than when θ=0° (FIG. 11B), and results specific to loop antennas are obtained.

Hence from these directional characteristics, it is seen that an antenna of this invention has satisfactory directional characteristics. Hence when using an RFID tag with an antenna of this invention mounted as an RFID tag for an article, application is possible to animals and to other articles that move as well, and the range of applicability is broad. By means of this invention, a tag antenna within an extremely limited area of diameter approximately 35 mm, and which resonates with an RFID LSI chip having a capacitance component, as well as an RFID tag on which this antenna is mounted, can be provided.

Further, by means of this invention, the positioning of a bypass conducting path forming an inductor having inductance L, which resonates with the capacitance C of the interface portion of an LSI chip and which is calculated in advance, as well as optimal dimensions according to the dielectric constant and thickness of dielectric plates, can easily be determined.

Further, in manufacturing processes, upper and lower dielectric members can easily be stacked regardless of the position of the LSI chip.

The invention claimed is:

1. An RFID tag, comprising:
    an antenna; and
    an LSI chip connected in parallel to the antenna,
    wherein the antenna comprises:
    a feed terminal connected to the LSI chip;
    a loop antenna formed of a conductive looped line connected to the feed terminal; and a bypass conducting path the width of which is not thicker than the width of the conductive looped line forming the loop antenna, and which bypasses the loop of the loop antenna, wherein the bypass conducting path is positioned at a distance S from the center of the loop antenna, and the magnitude of the distance S is set so that an inductance due to the bypass conducting path has a prescribed inductance value, at which resonance occurs with a capacitance value of the interface portion of the LSI chip connected to the feed terminal.

2. The RFID tag according to claim 1, further comprising a dielectric plate which is positioned on the side of at least one face of the antenna, and which holds the antenna.

3. The RFID tag according to claim 2, wherein a penetrating hole is provided in the center of the dielectric plate.

4. The RFID tag according to claim 3, wherein the bypass conducting path has an arc, along the periphery of the penetrating hole, which avoids the penetrating hole.

5. The RFID tag according to claim 2, wherein the dielectric plate has a ring-shape depression, corresponding to the loop antenna, and having a width and depth at least enabling accommodation of the LSI chip.

6. The RFID tag according to claim 2, wherein the antenna is formed, on a sheet, from a conductor the main component of which is any one among Cu, Ag, and Al.

* * * * *